July 3, 1956  H. A. PAGE  2,753,001
METHOD AND APPARATUS FOR PERFORATING A FLEXIBLE CONDUIT
Filed Aug. 16, 1952  2 Sheets-Sheet 1

INVENTOR.
Henry A. Page
BY
Martin E. Anderson
ATTORNEY

July 3, 1956  H. A. PAGE  2,753,001
METHOD AND APPARATUS FOR PERFORATING A FLEXIBLE CONDUIT
Filed Aug. 16, 1952  2 Sheets-Sheet 2

INVENTOR.
Henry A. Page
BY
Martin E. Anderson
ATTORNEY

United States Patent Office 2,753,001
Patented July 3, 1956

2,753,001

METHOD AND APPARATUS FOR PERFORATING A FLEXIBLE CONDUIT

Henry A. Page, Denver, Colo., assignor to The Gates Rubber Company, Denver, Colo., a corporation of Colorado Application August 16, 1952, Serial No. 304,671

8 Claims. (Cl. 164—99)

This invention relates to a spray hose, and particularly to methods and apparatus for its manufacture.

More particularly, the present invention is concerned with a lawn or garden sprinkling hose of the type comprising a very flexible conduit having spaced outlets along its length for discharging fine streams of water.

It is the primary object of this invention to create such a hose by puncturing a soft conduit to produce a definite spray pattern without removal of any of the material.

Another highly important object resides in the provision of a hose punctured to form perforations that normally are closed but that will open under pressure and expand automatically in accordance with increases in the applied pressure. The material preferably is a plastic such as polyvinyl chloride but may be any rubber-like material that has sufficient softness and elasticity.

Still another major object is to flatten the conduit and punch through both sides simultaneously in a direction perpendicular to the flat surfaces.

A further important object is to devise a novel machine for handling and puncturing a flexible tubular conduit to form a spray pattern.

The foregoing and other objects should be clearly apparent from a study of the following descriptive matter when taken in conjunction with the accompanying drawings and the appended claims.

Figure 6:
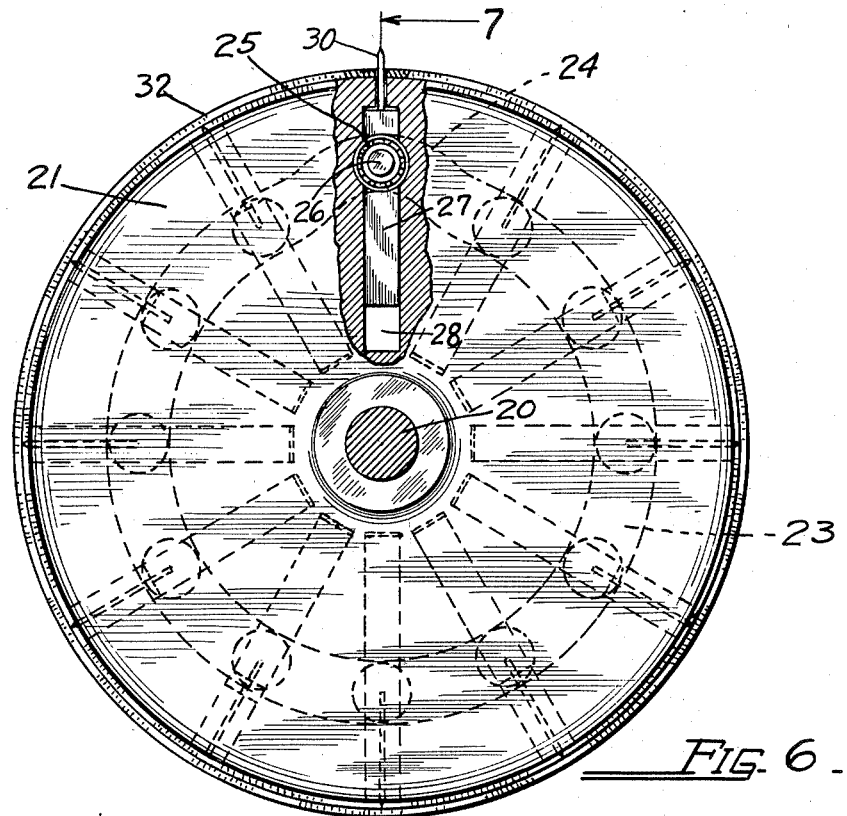
Figure 6 is a face view of the pin-carrying wheel of Figures 4 and 5.
Figure 1:
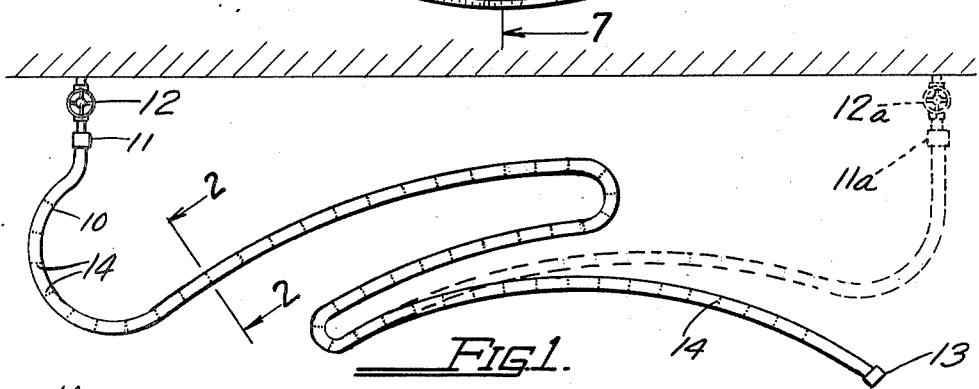
Figure 1 shows the hose made by the method and apparatus of the invention connected up for service.
Figure 2:
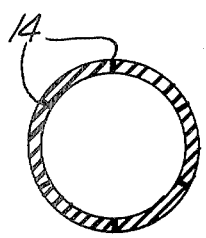
Figure 2 represents a cross section taken on line 2—2, Figure 1.
Figure 3:
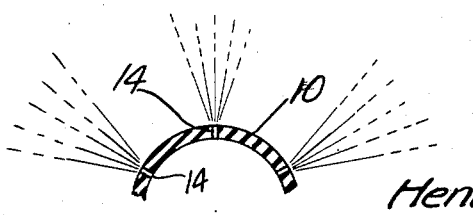
Figure 3 is a fragmentary section showing how an aperture becomes distended under pressure.

With continued reference to the drawings, and first to Figures 1–3, a hose 10 is connected by an end coupling 11 to a water valve 12, and a simple closure cap 13 is provided to seal the free end of the hose. If the hose is extremely long or the water pressure quite low it may be desirable to use a second coupler 11a at the other end for connection to valve 12a, so as to get a uniform spray pattern from end to end.

The material, vinyl plastic or the like, is sufficiently soft and flexible to permit the hose to be tossed around like a rope to get any desired path, either curved or straight, along the ground; and yet it must have sufficient rigidity to prevent high water pressure from kicking it around to straighten it out.

The spray is discharged through apertures 14, formed by puncturing without removing any material; and any desired pattern (spiralling, etc.) may be followed. In the preferred illustrated form, the apertures are spaced apart in parallel lines longitudinally of the hose, 60 degrees apart. Instead of the six series one might use only four, 90 degrees apart, or any other desired number. Also, there could be staggering of the holes of the series with respect to one another.

Normally the punctures are closed and substantially self-sealed, but when pressure is applied they open as in Figure 3, the degree of opening corresponding generally with the pressure. They have the further advantage that they do not tend to clog with external matter when the hose is dragged around in, for example, garden soil.

In the method of this invention, successive portions of a flexible conduit are moved along a curved convex path, such as arcuate, the conduit is flattened along at least a portion of the path, a series of piercing needles are simultaneously moved along a path, such as circular, which includes at least a portion of the conduit path and including at least the part along which the conduit is flattened, and successive needles are moved into and through both layers while the conduit is flattened.

Figures 4, 5:
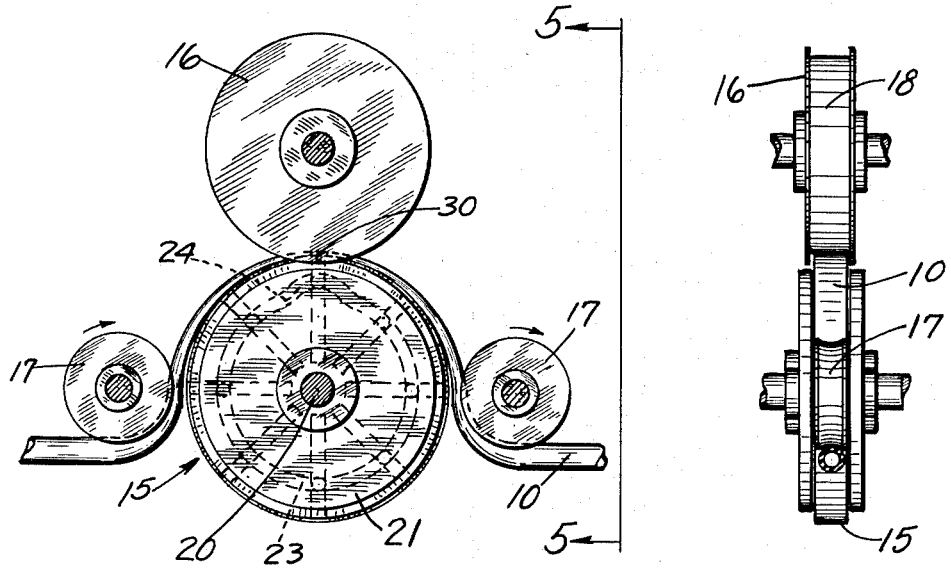
Figure 4 is a somewhat schematic view, in side elevation, of a preferred form of apparatus for carrying out the method of manufacture.
Figure 5 is taken on the plane of line 5—5, Figure 4.
Figure 7:
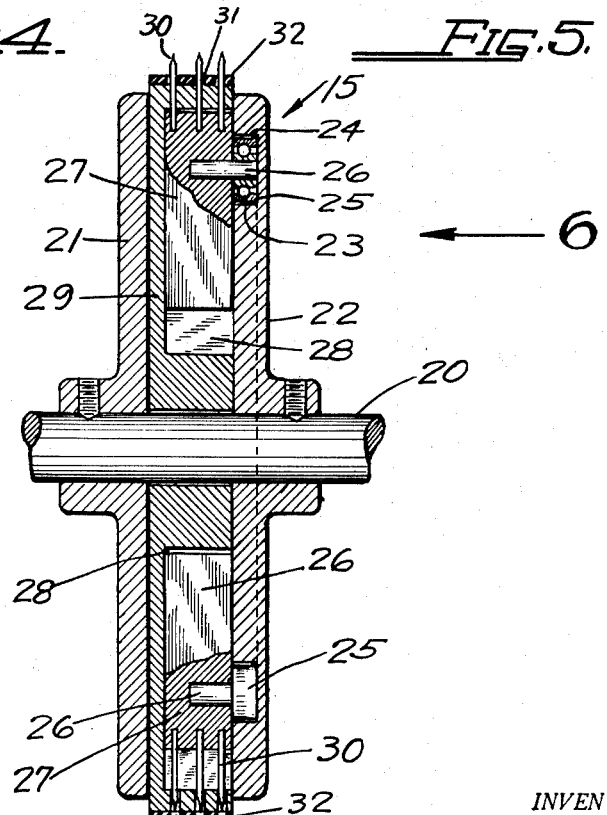
Figure 7 is a vertical section taken along line 7—7, Figure 6.

One form of machine for puncturing the hose is seen in Figure 4, where there is a puncturing device or roll 15 associated with an abutment wheel 16 and a pair of hose-guiding rolls 17. All of these members are actuated simply by pulling the hose through the machine. As the hose leaves the first guide roll it is gradually flattened, its walls coming fully together between device 15 and a soft rubber ring 18 on the periphery of the wheel 16. Thereafter, the hose gradually opens up again (to round, oval or whatever initial shape it had) as it passes to and under the second guide roll. Puncturing takes place on the line of tangency between members 15 and 16, as follows.

A stationary shaft 20 rigidly supports a pair of parallel plates 21, 22 which form part of the device 15. Plate 22 has an inwardly open surface groove 23 that is annular except for an abrupt rise 24 at the top. It forms an endless cam track for a multiplicity of followers in the form of ball bearing assemblies 25, each mounted on a pin 26. The pins are set fixedly into a corresponding number of small rectangular plates 27 that can slide radially in channels 28 formed in a cylindrical disc 29 that can rotate freely on the shaft 20.

The outer end of each slide plate 27 carries several puncturing elements 30, side by side. These preferably are smooth, steel phonograph needles, set or locked securely in radial position. They can be pushed outwardly through holes 31 in a peripheral band 32 that runs against the hose. As the latter is pulled through the machine it rotates the disc 29, thus causing the sets of needles to run out when each reaches the cam track portion 24, to quickly and neatly puncture both flat walls or layers of the hose and then to retire again.

The points of the needles pass through the hose and into the rubber ring 18 to assure complete perforations. No material is removed from the hose. The diameter of the wheel preferably is such that the needles do not keep piercing the rubber ring 18 at the same points.

The invention should now be clear from the foregoing running description. Obviously some changes may be made without departure from the spirit of the invention. Therefore I wish to be limited, as is customary only be reasonably liberal interpretation of the scope of the appended claims.

What is claimed as new is:

1. A method of making a sprinkling hose and the like, which comprises moving successive portions of a flexible conduit along a curved, convex path; flattening said conduit along at least a part of such path; simultaneously moving a series of piercing needles along at least a portion of such path and including such part along which said conduit is flattened; and reciprocally moving successive piercing needles into and through both layers of said conduit, while said conduit is flattened.

2. A method of making a sprinkling hose and the like, as defined in claim 1, wherein said curved conduit path is generally arcuate and said piercing needles are moved around a generally circular path.

3. A machine for puncturing a garden hose and the like comprising a stationary shaft; a pair of circular plates mounted on said shaft in spaced concentric relation; means clamping said plates to said shaft to prevent relative rotation between said plates and said shaft, the inner surface of one of said plates having a cam groove which is concentric with said shaft except at one point at which said groove extends abruptly outwardly to provide a rise; a circular disk having a central shaft receiving opening and mounted for rotation in the space between said spaced plates, the side of said disk which faces said cam groove having a plurality of radial channels with parallel side walls, each said channel terminating at its outer end in a circumferential wall having at least one radial opening; rectangular plates mounted for reciprocation in said channels, each said plate having a proper size to fit the corresponding channel but being shorter in length than said channel and the outer end of each rectangular plate having at least one sharp pointed needle attached thereto with a portion thereof positioned in the opening in said end wall of said channel, each said needle having such length that when said rectangular plate is in its outermost position the needle will project beyond the periphery of said disk; a cam follower projecting from each rectangular plate into said cam groove, the parts being so proportioned that each needle will project beyond the peripheral surface of said disk a distance greater than the thickness of the material to be perforated when the cam follower passes over the rise in the cam groove; an abutment wheel having its outer peripheral surface provided with resilient, readily puncturable material into which the tip of a needle projects after passing through the material being perforated; and a shaft for said abutment wheel and having its axis in line with the axis of said first mentioned shaft and the center point of the rise of said cam groove and a fixed distance from said first shaft.

4. In a machine as defined in claim 3, a guide roll on each opposite side of said disk and mounted for rotation on an axis adjacent said disk and spaced circumferentially from said abutment roll to hold a hose or the like in contact with an extended arc of said disk.

5. Apparatus for making a sprinkling hose and the like, comprising a rotatable disk having circumferentially spaced holes in its outer periphery; a plurality of radially reciprocable members carried by said disk and each provided with at least one needle movable radially through a disk hole a distance sufficient to puncture a hose or the like in engagement with the periphery of said disk; a roller at each side of said disk for maintaining a hose or the like in engagement with said disk; a stationary cam generally concentric with the axis of rotation of said disk and having a rise at a point intermediate said rollers, said rise having an elevation corresponding to the distance through which said needles move for puncturing; and means engaging said cam for moving said members outwardly as each said member in turn reaches the position of said cam rise.

6. Apparatus as defined in claim 5, wherein said disk is freely rotatable and the periphery thereof is provided with material for frictionally engaging said hose or the like for rotating said disk as said hose or the like moves thereover.

7. Apparatus as defined in claim 5, including a rotatable wheel mounted to engage said hose or the like at a point opposite said cam rise so as to maintain said hose in engagement with said disk when said needles puncture said hose.

8. Apparatus as defined in claim 7, wherein said wheel has a transversely flat periphery which flattens said hose as said hose is punctured; and the periphery of said wheel is provided with resilient material into which the points of said needles may extend as each needle punctures said hose.

References Cited in the file of this patent

UNITED STATES PATENTS

| 818,938 | Crane | Apr. 24, 1906 |
|---|---|---|
| 1,260,694 | Marrisford | Mar. 26, 1918 |
| 1,955,231 | Frederick | Apr. 17, 1934 |
| 2,083,370 | Greulich | June 8, 1937 |
| 2,316,054 | Davis et al. | Apr. 6, 1943 |
| 2,566,833 | Healy | Sept. 4, 1951 |
| 2,619,177 | Proturlon | Nov. 25, 1952 |
| 2,621,075 | Sedar | Dec. 9, 1952 |
| 2,699,208 | Schur | Jan. 11, 1955 |

FOREIGN PATENTS

| 22,504 | Great Britain | Oct. 26, 1898 |
|---|---|---|
| 609,931 | Germany | Feb. 28, 1935 |